US006873906B2

(12) United States Patent
Lueer et al.

(10) Patent No.: US 6,873,906 B2
(45) Date of Patent: Mar. 29, 2005

(54) METHOD OF INPUTTING A DESTINATION INTO A NAVIGATION DEVICE, AND NAVIGATION DATABASE

(75) Inventors: Stefan Lueer, Hildesheim (DE); Martin Kossira, Marbach am Neckar (DE); Steffen Hess, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 10/600,929

(22) Filed: Jun. 20, 2003

(65) Prior Publication Data

US 2004/0128064 A1 Jul. 1, 2004

(30) Foreign Application Priority Data

Jun. 20, 2002 (DE) .......................... 102 27 518

(51) Int. Cl.[7] .............................................. G01C 21/26
(52) U.S. Cl. ...................... 701/202; 701/202; 701/211; 340/995.23
(58) Field of Search ................................ 701/201, 202, 701/208, 209, 210, 211, 200; 340/995.16, 995.19, 995.23, 995.24, 995.27, 995.28

(56) References Cited

U.S. PATENT DOCUMENTS 6,587,782 B1 * 7/2003 Nocek et al. ................ 701/200
6,687,613 B2 * 2/2004 Yokota ........................ 701/209

* cited by examiner

Primary Examiner—Tan Q. Nguyen
(74) Attorney, Agent, or Firm—Kenyon & Kenyon

(57) ABSTRACT

A method of inputting a navigation destination into a navigation device, where a place name of the navigation destination is entered, where in the event that there are, in a navigation database, a plurality of navigation destinations having the same place name, supplemental information is output for the plurality of navigation destinations, allowing differentiation of the navigation destinations in each case. With this method, the supplemental information includes information about the direction and/or distance from a nearby or nearest prominent point. A navigation database for performing the method, in which position coordinates, in particular central point position coordinates, are stored for each stored navigation destination and for each of the prominent points which may be output as part of the supplemental information. This facilitates resolution of ambiguity when entering navigation destinations which is improved for the user, because it may be more easily understood.

7 Claims, 2 Drawing Sheets

METHOD OF INPUTTING A DESTINATION INTO A NAVIGATION DEVICE, AND NAVIGATION DATABASE

FIELD OF THE INVENTION

The present invention is directed to a method of inputting a navigation destination into a navigation device.

BACKGROUND INFORMATION

In some navigation devices, a navigation destination may be entered by inputting a town name or city name and, if appropriately detailed information is available in a navigation database, it may then be put in concrete terms in the form of entry of the street name and house number. In the case of a plurality of navigation destinations having the same place name, with such devices, supplemental information is output which is intended to enable the user to select the desired navigation destination from among the set of navigation destinations having the entered place name. With such navigation devices, this information may pertain to postal codes or postal code ranges and/or the names of the administrative districts in which the navigation destinations are located.

Specifically for users who are unfamiliar with the place, the named supplemental information may prove inadequate for reliably specifying the navigation destination from among the set of navigation destinations offered.

SUMMARY OF THE INVENTION

The exemplary embodiment and/or exemplary method of the present invention is intended to facilitate resolution of ambiguity when entering navigation destinations which is improved for the user, because it is more easily understood.

This is achieved according to the exemplary embodiment and/or method of the present invention by providing that for an entered place name for which a plurality of navigation destinations exist, the issued supplemental explanatory information includes information about the direction and/or distance from the nearest prominent point. Alternatively, in certain situations the supplemental information may include information about the direction and/or distance from some other nearby prominent point rather than the nearest one.

A prominent point in the meaning used above, according to one exemplary embodiment of the present invention, is in particular the name of a large city near or nearest to the navigation destination.

Advantageously, the information about direction and/or distance is specified on the basis of position coordinates of the navigation destinations and the prominent points. To that end, position coordinates, in particular central point position coordinates, i.e., in particular the position coordinates of the centers of the large cities, are stored in a navigation database for each stored navigation destination and for each of the prominent points that may be output as part of the supplemental information.

An exemplary embodiment of the present invention may result in a simplification, due to the fact that the navigation database, which contains in particular street and place data for a section of the earth's surface, is subdivided into tiles covering geographic regions adjacent to each other, and that initially only those tiles in which the navigation destinations are located whose name was entered are considered when determining the supplemental information. This may substantially reduce the volume of data to be exchanged between the database and the computer or microprocessor of the navigation device for the purpose of determining the supplemental information. This may be of particular significance especially when the database is held in a data bank external to the navigation device, and an exchange of data between the navigation device and the data bank is handled for example via a fee-based mobile radio interface.

Another exemplary embodiment results from the fact that in the event that no prominent point is available in a tile containing a navigation destination whose name was entered, the tiles immediately surrounding the tile in question are checked for the presence of a prominent point. In this way, the volume of data to be transported and/or managed for the purpose of determining the supplemental information can initially be kept small, but at the same time the possibility of searching in the entire data contents available in the database is enabled. Furthermore, this procedure allows expedient limitation of the volume of data to be managed, which also is expanded for the purpose of enlarging the search radius.

A specially adapted navigation database for performing the exemplary method described above is distinguished, according to the exemplary embodiment and/or method of the present invention, by the fact that position coordinates, in particular central point position coordinates, are stored for each stored navigation destination and for each of the prominent points which may be output as part of the supplemental information.

DETAILED DESCRIPTION

Figure 1:
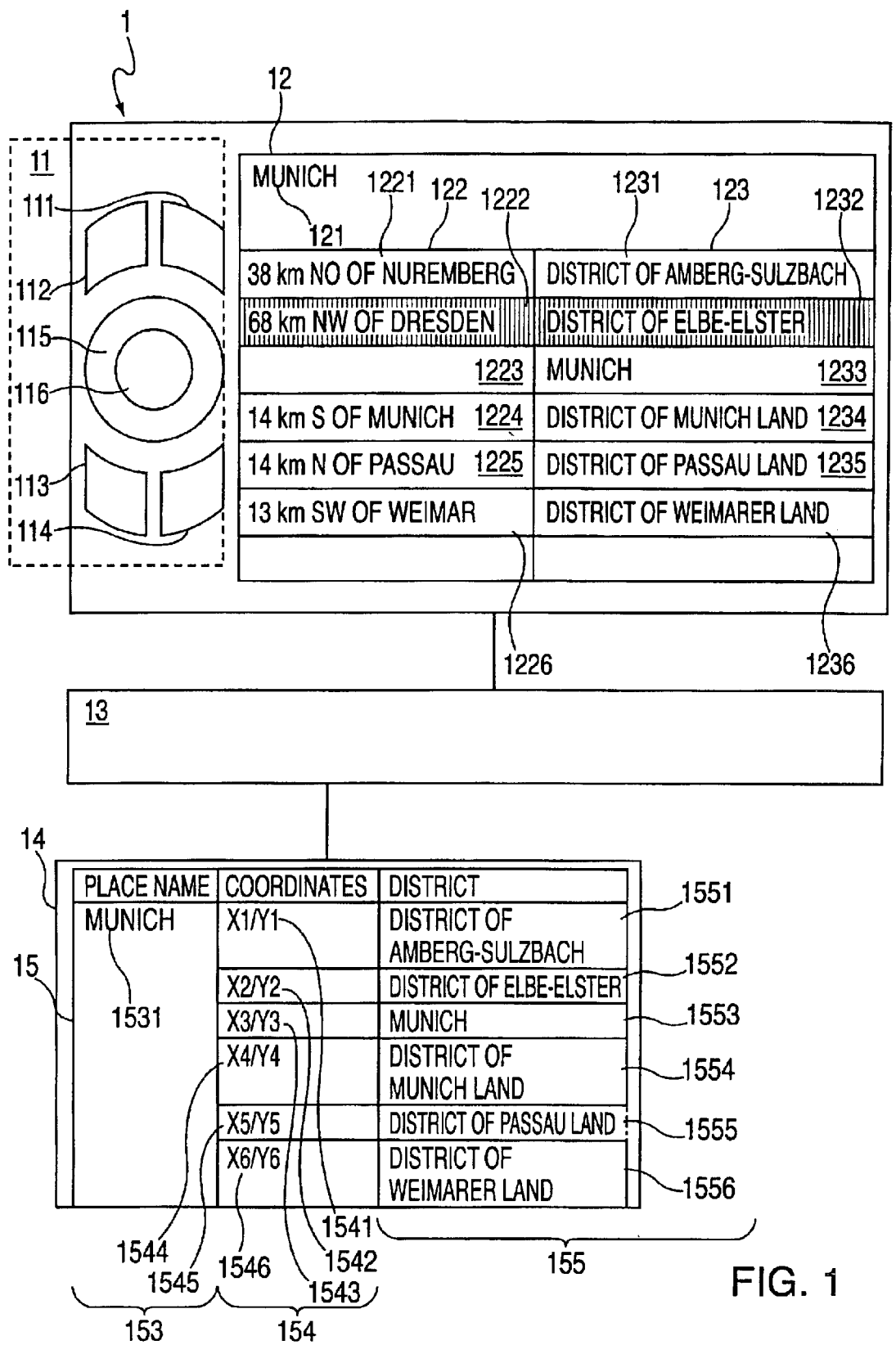
FIG. 1 shows a block diagram of a vehicle navigation device for performing the exemplary method using an exemplary database, all according to the exemplary embodiment and/or method of the present invention.

FIG. 1 shows a block diagram of a navigation device according to the present invention for performing the exemplary method of the present invention, using the concrete example of a vehicle navigation device 1.

Vehicle navigation device 1 includes a user interface (MMI) having an input unit 11 and a display unit 12. Input unit 11 has various control elements, such as an increment detector 115 connected to a rotary knob, having a centrally positioned confirmation or "Enter" button 116. The rotary knob is used to move a cursor in a selection list shown on the display unit, which is symbolized in the figure by the shading on display unit 12, or alternatively for adjusting a preselected parameter, such as adjusting the playback volume of an audio component which may be integrated into navigation device 1. An entry selected in the selection list using the cursor may be selected in a known manner by actuating confirmation button 116.

Control unit 11 also includes additional control elements, such as pushbutton switches 111, 112, 113 and 114, which may be used for example to select a parameter to be adjusted, or to select a certain one from the set of selection lists, or to trigger other control functions, especially frequently needed ones.

User interface 11, 12 is connected to a microprocessor 13, which runs operating software to operate navigation device 1.

Also connected to microprocessor 13 is a data bank 14, which may be implemented for example in the form of a data CD-ROM inserted into a CD-ROM drive. Alternative embodiments of an internal mass storage device may also be used. According to an alternative embodiment of the data bank, it may also be external to the navigation device and may be kept for example by an external service provider, with data needed for the exemplary method according to the present invention, as well as for the actual navigation, being suppliable to microprocessor 13 as needed, for example via a mobile radio connection between supplier and navigation device 1.

Data bank 14 contains a database 15 for performing the exemplary method according to the present invention. This database includes a list 153 of place names of potential navigation destinations, which may be the names of all towns, communities and cities lying within a section of the earth's surface that is of interest, i.e., for example the names of all towns, communities and cities in Germany or Europe. A section of database 15 illustrated in the figure shows the place name Munich (1531) as a component of place name list 153.

For every place name, the coordinates of the town or city centers of all towns, communities or cities with this place name are stored in a coordinate list 154. In the case illustrated in the figure, for example, there exist in Germany six towns or cities with the name Munich (1531), having the position coordinate pairs X1/Y1 (1541), X2/Y2 (1542), X3/Y3 (1543), X4/Y4 (1544), X5/Y5 (1545) and X6/Y6 (1546). The position coordinates may be indicated for example in degrees of geographic longitude and latitude.

In an explanatory list 155 are stored explanations 1551, 1552, 1553, 1554, 1555 and 1556 for the respective coordinate pairs of coordinate list 154, which permit assignment of the position coordinates to a particular territory or region in a way readily understandable to the user. In the case in FIG. 1, these are the names of administrative units, here in particular of the rural or urban districts in which the places named "Munich" are located. Alternatively or in addition to the district names, postal codes or ranges of postal codes may be stored in explanatory list 155 as explanatory information.

Navigation device 1 is the basis for the exemplary method according to the present invention of navigation destination input, as explained below.

By turning rotary knob 115, the user first selects a letter from the alphabet shown on display unit 12, and then inputs it as the first letter of the place name of the navigation destination by then pressing confirmation button 116. In the same way, the user keeps inputting additional letters of the place name of the navigation destination, until the complete place name of the navigation destination has been entered or a place name is able to be associated unambiguously with the entered character sequence on the basis of a comparison of the entered character sequence with the place names contained in database 15. In the example illustrated in the figure, place name 121 "Munich" has been entered in the described manner and is depicted in a first field on display unit 12.

After complete input of the place name of the navigation destination, microprocessor 13 ascertains all the places or potential navigation destinations in database 15 which have the entered place name, in this case "Munich." In the example illustrated in the figure there are six towns/communities/cities with the name "Munich" present in the database, namely "Munich" in the district "Amberg-Sulzbach," "Munich" in the district "Elbe-Elster," the Bavarian state capitol "Munich" (Munich), "Munich" in the rural district "Munich," "Munich" in the district "Passau Land" and "Munich" in the district "Weimarer Land." In addition, microprocessor 13 reads from the database position coordinate pairs 1541 through 1546 for the named potential navigation destinations having the place name "Munich."

Furthermore, microprocessor 13 reads from database 15 the coordinates of prominent points located in the vicinity of the potential navigation destinations, which are stored in database 14 in a form analogous to the potential navigation destinations, namely with place names, position coordinates and explanatory information. In the case of the exemplary embodiment described here, the prominent points may be large cities whose approximate geographic location may be assumed to be generally known to the general users of navigation device 1. However, prominent points in the sense of the exemplary embodiment and/or method of the present invention may also be, for example, larger rivers, mountains or mountain ranges, national boundaries, special sightseeing attractions, stretches of especially important travel routes such as autobahns, etc., or for example highways having special names, such as the "German Wine Route," "Romantic Route," etc.

Figure 2:
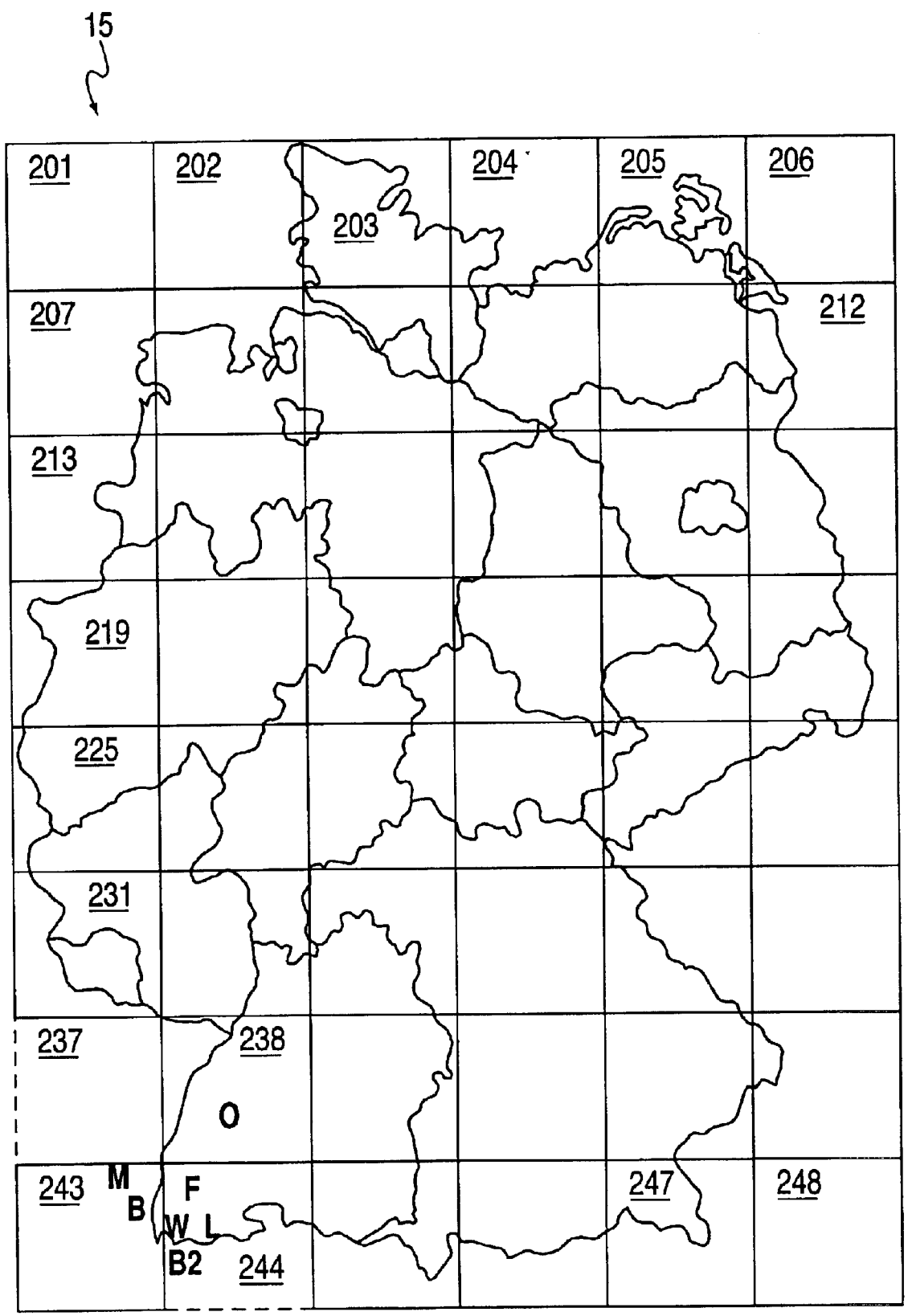
FIG. 2 shows a map detail as an example of information stored in a database for performing the exemplary method according to the present invention.

The quantity of data to be read by microprocessor 13 may be limited advantageously at this point in the exemplary method according to the present invention, by restricting the number of available prominent points for which the data must be read from the database into the microprocessor. This may be realized, for example, in conjunction with a special arrangement of the database. Such a special arrangement of database 15, which is portrayed for example in conjunction with FIG. 2, provides for the section of the earth's surface represented in database 15, i.e., for example the map data for Germany or Europe, to be subdivided into adjacent tiles 201, 202, 203, 204, 205, 206, 207, . . . , 212, . . . , 213, . . . , 219, . . . , 225, . . . , 231, . . . , 237, 238, . . . , 243, 244, . . . , 247, 248. In this case, microprocessor 13 ascertains those tiles or map sections within which the potential navigation destinations having the entered place name are located, and reads the data only for the prominent points that are located within the tiles in question.

For example, the map of Germany could be subdivided. In particular, it could be subdivided into tiles covering Germany's federal states. After input of the place name "Munich," the data for all the large cities in Germany for example (as prominent points) would not be read by the microprocessor from database 15, but instead only for those large cities that lie within tiles which also each contain a navigation destination having the place name "Munich." In the case of the Bavarian state capitol, for example, only the tile covering the Free State of Bavaria would be considered initially, and consequently only the data for the large cities located in the Free State of Bavaria would be read from the database by microprocessor 13. Similarly, for other potential navigation destinations having the place name "Munich," only the tiles in which there are potential navigation destinations having the name "Munich" would be considered.

In practice, it may not necessarily be appropriate to subdivide the section of the earth's surface represented in the database, in this case Germany, into federal states, because of the very different geographic extent of some of the federal states (for example the Free State of Bavaria and Saarland), and also the very different number of prominent points in each federal state (for example North-Rhine/Westphalia and Saarland). More meaningful, and more frequently encountered in practice, is a subdivision of a certain section of the earth's surface into tiles 201, . . . , 248 of essentially equal area or extent.

For case where no prominent points, or an inadequate number of fewer than two for example, lie within a tile 243 being considered, in which there is a potential navigation destination having the entered place name "B," the system provides for the search radius for ascertaining prominent points to be extended to the tiles immediately surrounding the tile in question. Because of the marginal location of navigation destination "B" within tile number 243, there no large cities in tile 243 that are suitable as prominent points, at least in Germany. For that reason, according to the exemplary embodiment and/or method of the present invention the scope of the search for suitable prominent points is extended to the tiles immediately adjacent to the examined tile 243. Due to the marginal position of examined tile 243 relative to the geographic region covered by the database in the example in FIG. 2, these are only the adjacent tiles 237, 238 and 244. Prominent points in the meaning of the exemplary embodiment and/or method of the present invention, i.e., in this case large cities for example, are found only in the additionally examined tiles 238, namely the city named "O," and 244, here namely the cities named "F,", "L" and "W." In the event that foreign cities should or may also be considered as prominent points, the French city "M" in the same tile 243 in which the potential navigation destination with the place name "B" is located will be considered, as well as the Swiss city "B2" in tile number 244.

Based on the position coordinates read from the database for the potential navigation destinations with the entered place name, and also the position coordinates read for the large cities located near them, the microprocessor determines the distances, which may be straight line distances, from the potential navigation destinations to the prominent points located near them, i.e., in this case large cities.

On the basis of the calculated distances between potential navigation destinations and the prominent points determined for each of them, the most significant prominent points may be selected in each case, i.e., in most cases the ones closest to the potential navigation destinations, as supplemental information for the potential navigation destinations.

In addition, the microprocessor also determines directional information based on the position coordinates of potential navigation destinations and prominent points, which specifies the direction in which each potential navigation destination lies relative to the particular selected prominent point.

If a preliminary selection of the prominent points has not yet been made based on the distance determined, a most suitable prominent point may now be selected for each of the potential navigation destinations on the basis of the straight line distances and direction information determined, allowing for additional criteria if appropriate.

The calculated information is output as supplemental information for the entered place name. If a plurality of potential navigation destinations with the entered place name exist, relative positional information corresponding to each of the potential navigation destinations is calculated and output.

According to a first embodiment, from the set of prominent points (large cities) identified for each of the potential navigation destinations, those ones are selected in each case which have the shortest straight line distance from the particular potential navigation destination, i.e., the town/community/city having the entered name, "Munich" according to FIG. 1. Six different places which are possible navigation destinations were identified in the database for the place name "Munich." For each of the potential navigation destinations, microprocessor 13 determines its position relative to a prominent point, especially to a nearest one, and outputs it on display unit 12 in the form of a combined specification of distance and direction of the particular potential navigation destination from the particular identified corresponding prominent point as a supplemental note on the particular potential navigation destination.

Thus, in the case of the entered place name "Munich," in a second area 122 of display unit 12, the positions of the navigation destinations with the place name "Munich" available in the database relative to the nearest large cities are output, i.e., "38 km northeast of Nuremberg" (1221) for "Munich" in the district "Amberg-Sulzbach," "68 km northwest of Dresden" (1222) for "Munich" in the district "Elbe-Elster," no explanatory information (1223) for the Bavarian state capital "Munich", "14 km south of Munich" (1224) for "Munich" in the district "Munich Land," "14 km north of Passau" (1225) for "Munich" in the district "Passau Land" and "13 km southwest of Weimar" (1226) for "Munich" in the district "Weimar Land."

In the event that large cities may be considered as prominent points, provision may be made for the size of the large cities which are possible prominent points to be chosen depending on the density of large cities in the vicinity of the potential navigation destination. For example, when place names with associated destinations in the Saarland are entered, the city "Saarlouis" may function as a prominent point, even though it may be smaller for example than the city "Mülheim" in the Ruhr region, although the latter is not considered a prominent point in favor of the nearest larger city "Essen," due to the high density of large cities in the Ruhr region.

Furthermore, cities or prominent points whose names refer to a region, such as "Saarbrücken," for example, may be used as supplemental information over other cities which are located in their vicinity and closer to the potential navigation destination.

Additional examples, in which prominent points which may be less significant or located at a greater distance from the potential navigation destination are output as supplemental information, may be used that lie within the scope of the exemplary embodiment and/or method of the present invention.

Instead of indicating the position of the potential navigation destinations with the entered place name relative to the nearest large city, positions relative to other prominent points, such as large rivers, national boundaries, special sightseeing attractions, highway names (e.g., on the A8, etc.), or for example roads with special names (such as "on the Wine Route," "on the Romantic Route," etc.) may be output.

It may also be provided that not necessarily the position relative to the nearest large city is output, but the position relative to one large city among a number of nearby large cities, that stands out in particular emphasized, for example, due to its position relative to the navigation destination.

Finally, additional explanatory information contained in database 15 is displayed in a third field 123, in the example in FIG. 1 the names of districts 1231, 1232, 1233, 1234, 1235 and 1236, to which the potential navigation destinations with the name "Munich" belong.

From the navigation destinations with the entered place name represented on display unit 12 of navigation device 1 as described, the desired navigation destination may be indicated by highlighting one of the entries using cursor controller 115, and may be entered by pressing confirmation button 116.

What is claimed is:

1. A method of inputting a navigation destination into a navigation device associated with a navigation database, the method comprising:

entering a place name of the navigation destination, and if a plurality of navigation destinations having the same place name are in the navigation database, outputting supplemental information for the plurality of navigation destinations to allow differentiation of the navigation destinations in each case, wherein the supplemental information includes information about at least one of a direction and a distance from at least one of a nearby prominent point and a nearest prominent point.

2. The method of claim 1, wherein the supplemental information includes information about at least one of the direction and the distance from at least one of a nearby large city and a nearest large city.

3. The method of claim 1, wherein the information about the at least one of the direction and the distance is specified based on position coordinates of the navigation destinations and the prominent points.

4. The method of claim 1, wherein the navigation database is subdivided into tiles covering geographic regions adjacent to each other, and only those tiles in which the navigation destinations are located whose place name was entered are initially considered when the supplemental information is determined.

5. The method of claim 4, wherein if no one of the prominent points is available in one of the tiles containing a navigation destination whose place name was entered, other ones of the tiles immediately surrounding the one of the tiles are checked for a presence of one of the prominent points.

6. A navigation database system comprising:

a navigation database;

an arrangement to perform:

entering a place name of the navigation destination, and if a plurality of navigation destinations having the same place name are in the navigation database, outputting supplemental information for the plurality of navigation destinations to allow differentiation of the navigation destinations in each case, wherein the supplemental information includes information about at least one of a direction and a distance from at least one of a nearby prominent point and a nearest prominent point;

wherein central point position coordinates are stored for each stored navigation destination and for each of the prominent points which are outputtable as part of the supplemental information.

7. The navigation database of claim 6, wherein, for each place name, a set of position coordinates of the navigation destinations with that place name is stored.

* * * * *